UNITED STATES PATENT OFFICE.

WALTER H. THEW, OF LIVERPOOL, COUNTY OF LANCASTER, ENGLAND.

CONDENSED PEPTONIZED MILK WITH COCOA.

SPECIFICATION forming part of Letters Patent No. 324,049, dated August 11, 1885.

Application filed December 4, 1884. (No specimens.) Patented in England November 13, 1884, No. 14,965.

*To all whom it may concern:*

Be it known that I, WALTER HENRY THEW, a subject of the Queen of Great Britain, residing at Liverpool, England, have invented certain new and useful Improvements in the Preparation of Condensed Peptonized Milk and Cocoa, (for which application for Letters Patent has been made in England, No. 14,965, of November 13, 1884,) of which the following is a specification.

I have discovered that cocoa conceals the bitter principle of peptonized milk, while it is itself in part digested by pancreatic extracts.

The product of the process about to be described possesses a good flavor, and has little or none of the bitter, and to some persons disagreeable, taste of peptonized milk, while in addition to the constituents of milk there are present the valuable nutritious and stimulent principles of cocoa in a form readily digestible by persons of weak digestive powers.

In preparing condensed peptonized cocoa and milk I proceed as follows: Having raised the temperature of the milk to be peptonized to preferably between 55° and 65° centigrade, I add to it from one third to one-fourth of its volume of a decoction of cocoa at about the same temperature, obtained by the action of boiling water on finely-powdered cocoa which has been previously deprived of a large part of the fat which it contained. The amount of cocoa which I prefer to use is in the proportion of five pounds of powdered cocoa to every hundred pounds of the milk employed. Either before or after the addition of the decoction of cocoa I add phosphate of soda, (formula $Na_2HPO_4+12H_2O$,) in the proportion of half an ounce to two ounces for each gallon of the mixture. I then add a sufficient quantity of active extract of pancreas, preferring an aqueous alcoholic or glycerine extract. Numerous varieties of these extracts are made and sold, and the amount of any one required can only be found by testing the particular sample with milk, it being remembered that a quantity of extract which will pretty completely peptonize a certain volume of milk will be sufficient for an equal volume of milk mixed with cocoa, as before mentioned.

The process of peptonizing of the mixture of milk and cocoa is allowed to go on for a period usually varying between one and two hours, according to the activity of the extract of pancreas employed, the temperature of the mixture being maintained at between 55° and 65° centigrade.

By the action of the pancreatic ferment the insoluble constituents of the cocoa, and particularly the starch which it contains, pass almost completely into solution. When the process of peptonizing is complete, the liquid is heated, and after being boiled for some minutes, so as to kill the ferment and any germs of noxious organisms which may have been contained in the milk and other materials used, sugar is added in about the same proportions as are employed in preparing sweetened condensed milk, and the peptonized cocoa and milk is concentrated in a vacuum-pan until it assumes a viscous consistence and contains from about twenty to twenty-five per cent. of water. It is then preserved in tins in the ordinary way.

The product, which becomes semi-solid on cooling, and which consists of concentrated peptonized milk and artificially-digested cocoa with sugar, possesses little or none of the bitter flavor of peptonized milk.

I claim as my invention—

1. Condensed peptonized milk with cocoa, as a new article of manufacture.

2. Condensed peptonized milk with cocoa and phosphate of soda, as a new article of manufacture.

In testimony whereof I have signed my name to this specification in the presence of two subscribing witnesses.

WALTER H. THEW.

Witnesses:
J. OWDEN O'BRIEN,
JOSEPH J. ROYDEN.